US012261363B2

(12) United States Patent
Su et al.

(10) Patent No.: US 12,261,363 B2
(45) Date of Patent: Mar. 25, 2025

(54) COMMUNICATION DEVICE

(71) Applicant: Wistron NeWeb Corp., Hsinchu (TW)

(72) Inventors: Jia-Hung Su, Hsinchu (TW); Kai Shih, Hsinchu (TW); Cheng-Geng Jan, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 202 days.

(21) Appl. No.: 18/167,148

(22) Filed: Feb. 10, 2023

(65) Prior Publication Data

US 2023/0318193 A1 Oct. 5, 2023

(30) Foreign Application Priority Data

Mar. 31, 2022 (TW) .................................. 111112411

(51) Int. Cl.
*H01Q 21/06* (2006.01)
*H01Q 15/00* (2006.01)

(52) U.S. Cl.
CPC ....... *H01Q 15/0086* (2013.01); *H01Q 21/065* (2013.01)

(58) Field of Classification Search
CPC .... H01Q 17/00; H01Q 19/06; H01Q 15/0086; H01Q 21/065; H01Q 17/001
See application file for complete search history.

(56) References Cited

U.S. PATENT DOCUMENTS

2012/0119969 A1* 5/2012 MacDonald ............ H01L 23/66 343/841
2014/0266974 A1 9/2014 Sharawi et al.
2017/0244454 A1* 8/2017 Urzhumov ........... H04B 7/0486
2019/0140357 A1* 5/2019 Grossman ............ H01Q 17/007

FOREIGN PATENT DOCUMENTS

CN 113745842 A 12/2021

* cited by examiner

*Primary Examiner* — Graham P Smith
(74) *Attorney, Agent, or Firm* — McClure, Qualey & Rodack, LLP

(57) ABSTRACT

A communication device includes a dielectric substrate, an antenna layer, a metamaterial layer, a first absorber element, a second absorber element, and a third absorber element. The dielectric substrate has a first surface and a second surface which are opposite to each other. The antenna layer is disposed on the first surface of the dielectric substrate. The metamaterial layer is adjacent to the antenna layer. The antenna layer and the metamaterial layer are both positioned between the first absorber element and the second absorber element. The third absorber element is disposed on the second surface of the dielectric substrate.

16 Claims, 11 Drawing Sheets

COMMUNICATION DEVICE

CROSS REFERENCE TO RELATED APPLICATIONS

This application claims priority of Taiwan Patent Application No. 111112411 filed on Mar. 31, 2022, the entirety of which is incorporated by reference herein.

BACKGROUND OF THE INVENTION

Field of the Invention

The disclosure generally relates to a communication device, and more particularly, to a communication device for reducing environmental interferences.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Antennas are indispensable in wireless communication. If an antenna used for signal reception and transmission is affected by environmental interference, this will degrade the communication quality of the device. Accordingly, it has become a critical challenge for antenna designers to design a communication device in which environmental interference is reduced.

BRIEF SUMMARY OF THE INVENTION

In an exemplary embodiment, the invention is directed to a communication device which includes a dielectric substrate, an antenna layer, a metamaterial layer, a first absorber element, a second absorber element, and a third absorber element. The dielectric substrate has a first surface and a second surface which are opposite to each other. The antenna layer is disposed on the first surface of the dielectric substrate. The metamaterial layer is adjacent to the antenna layer. The antenna layer and the metamaterial layer are both positioned between the first absorber element and the second absorber element. The third absorber element is disposed on the second surface of the dielectric substrate.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1A:
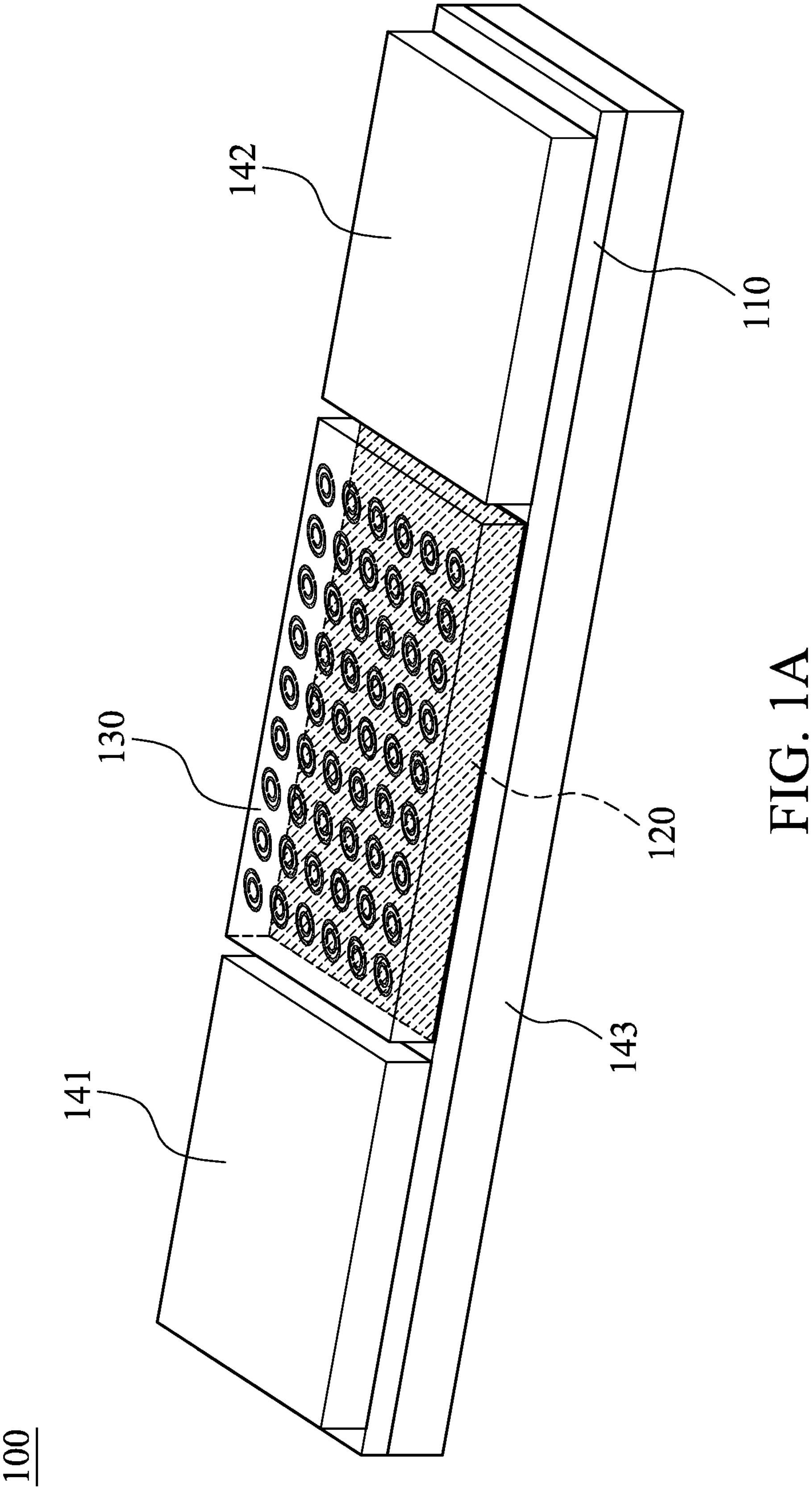
FIG. 1A is a perspective view of a communication device according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 1B:
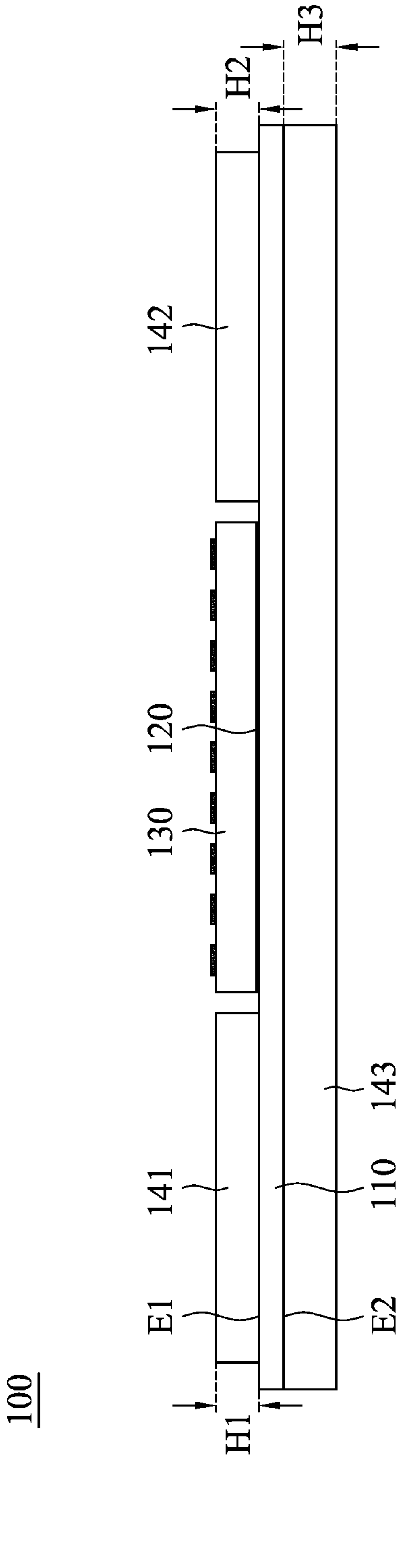
FIG. 1B is a side view of a communication device according to an embodiment of the invention.

FIG. 1A is a perspective view of a communication device 100 according to an embodiment of the invention. FIG. 1B is a side view of the communication device 100 according to an embodiment of the invention. Please refer to FIG. 1A and FIG. 1B together. The communication device 100 may be applied to a mobile device, such as a smart phone, a tablet computer, or a notebook computer. In the embodiment of FIG. 1A and FIG. 1B, the communication device 100 at least includes a dielectric substrate 110, an antenna layer 120, a metamaterial layer 130, a first absorber element 141, a second absorber element 142, and a third absorber element 143. The antenna layer 120 may be made of a metal material, such as copper, silver, aluminum, iron, or their alloys.

The dielectric substrate 110 may be an FR4 (Flame Retardant 4) substrate, a PCB (Printed Circuit Board), or an FPC (Flexible Printed Circuit). The dielectric substrate 110 has a first surface E1 and a second surface E2 which are opposite to each other.

The antenna layer 120 is disposed on the first surface E1 of the dielectric substrate 110. The antenna layer 120 includes at least one antenna element. The shape and type of the antenna element is not limited in the invention. For example, the aforementioned antenna element may be a monopole antenna, a dipole antenna, a patch antenna, a loop antenna, a PIFA (Planar Inverted F Antenna), or a hybrid antenna. In some embodiments, the antenna layer 120 can support a mmWave (Millimeter Wave) operational frequency at 60 GHz.

The metamaterial layer 130 is adjacent to the antenna layer 120. The antenna layer 120 is disposed between the metamaterial layer 130 and the dielectric substrate 110. It should be noted that the term "adjacent" or "close" over the disclosure means that the distance (spacing) between two corresponding elements is smaller than a predetermined distance (e.g., 10 mm or the shorter), or means that the two corresponding elements directly touch each other (i.e., the aforementioned distance/spacing between them is reduced to 0).

The first absorber element 141 and the second absorber element 142 are both disposed on the first surface E1 of the dielectric substrate 110. The antenna layer 120 and the metamaterial layer 130 are both positioned between the first absorber element 141 and the second absorber element 142. In addition, the third absorber element 143 is disposed on the second surface E2 of the dielectric substrate 110. For example, each of the first absorber element 141 and the second absorber element 142 may substantially have a relatively small rectangular shape, and the third absorber element 143 may substantially have a relatively large rectangular shape, but they are not limited thereto. In alternative embodiments, the first absorber element 141, the second absorber element 142, and the third absorber element 143 are integrated with each other, and they can extend from the second surface E2 onto the first surface E1 of the dielectric substrate 110. In some embodiments, the absorption frequency of electromagnetic waves of the first absorber element 141, the second absorber element 142, and the third absorber element 143 are from 10 GHz to 100 GHz, and they are configured to absorb the electromagnetic waves from 10 GHz to 100 GHz, especially for those from the antenna layer 120.

According to practical measurements, the proposed communication device 100 can help to reduce the refraction and reflection relative to the antenna layer 120 (i.e., multipath interferences), such that the surrounding environment does not negatively affect the whole communication quality of the communication device 100 so much. The following embodiments will introduce different configurations and detailed structural features of the communication device 100. It should be understood that these figures and descriptions are merely exemplary, rather than limitations of the invention.

Figure 2A:
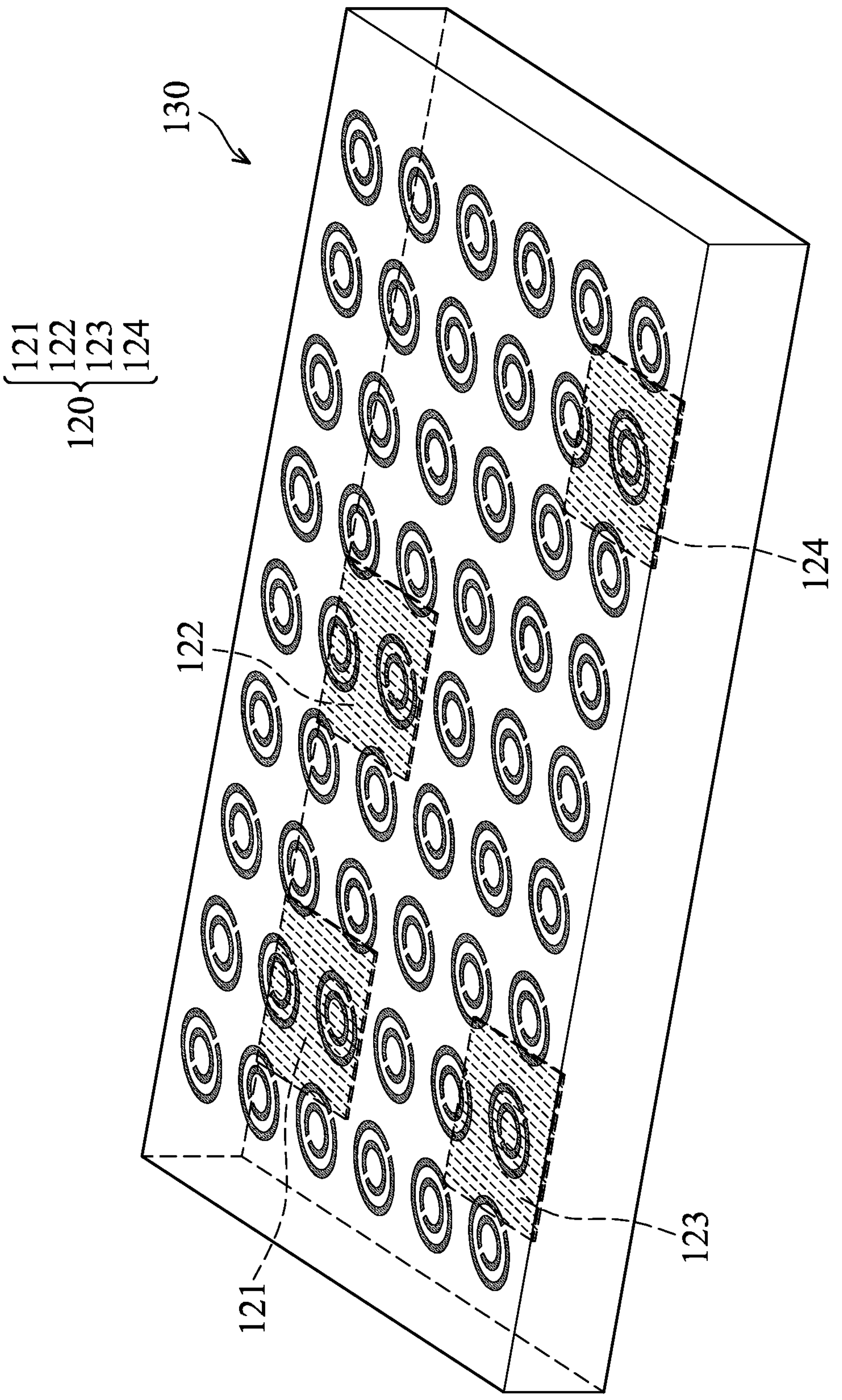
FIG. 2A is a perspective view of an antenna layer and a metamaterial layer according to an embodiment of the invention.
Figure 2B:
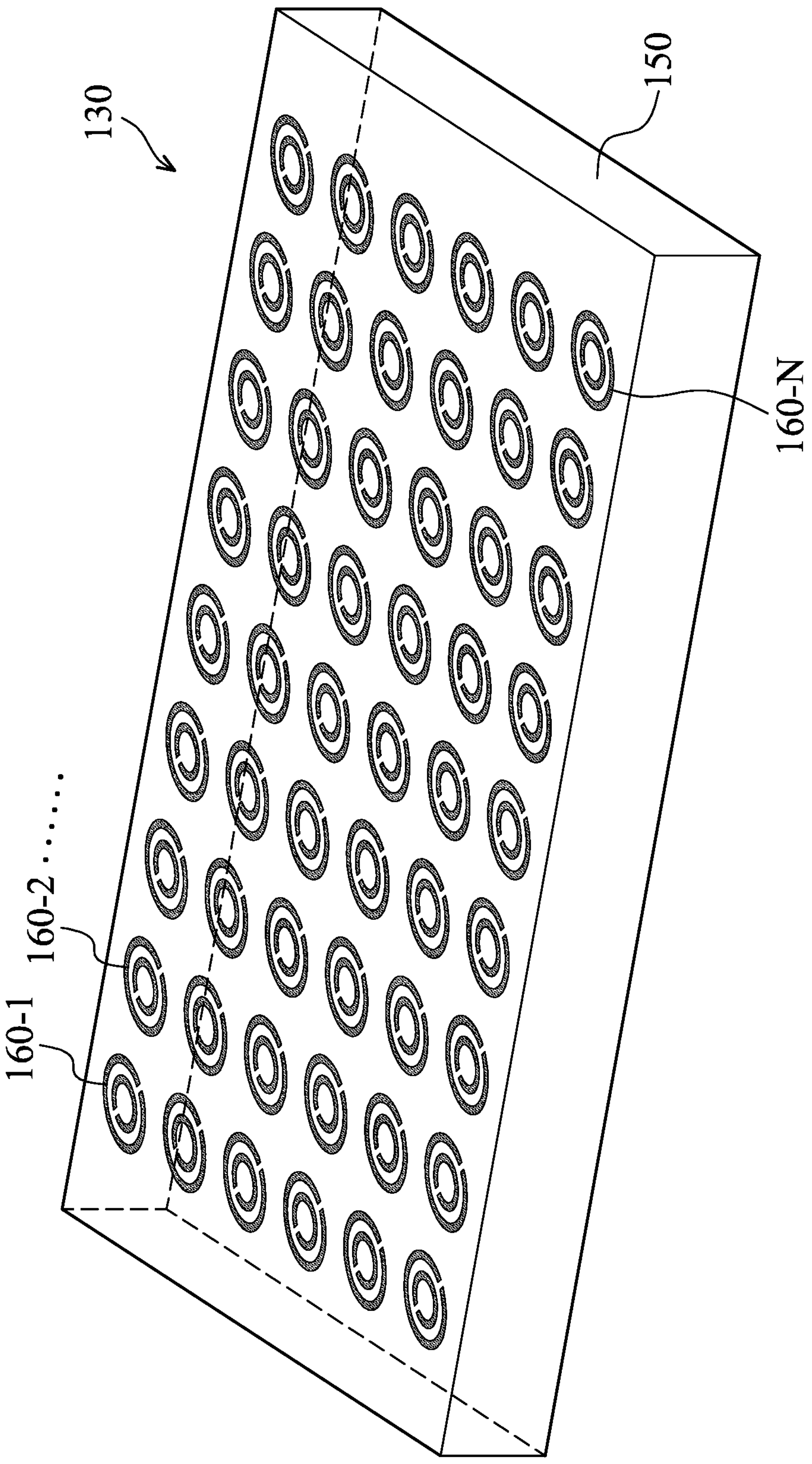
FIG. 2B is a perspective view of a metamaterial layer according to an embodiment of the invention.
Figure 2C:
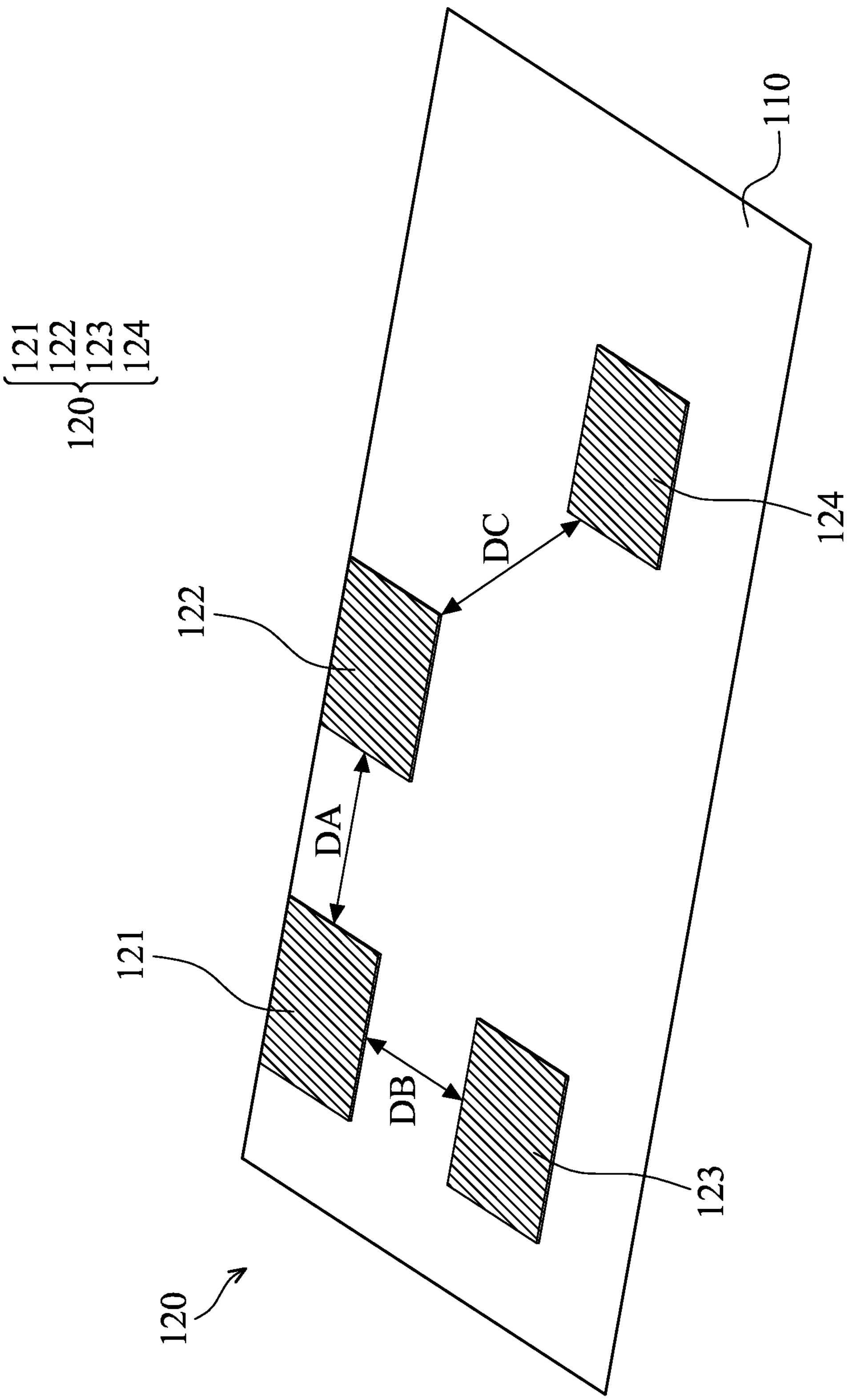
FIG. 2C is a perspective view of an antenna layer according to an embodiment of the invention.

FIG. 2A is a perspective view of the antenna layer 120 and the metamaterial layer 130 according to an embodiment of the invention. FIG. 2B is a perspective view of the metamaterial layer 130 (the antenna layer 120 is omitted) according to an embodiment of the invention. FIG. 2C is a perspective view of the antenna layer 120 (the metamaterial layer 130 is omitted) according to an embodiment of the invention.

In the embodiment of FIGS. 2A, 2B and 2C, the antenna layer 120 includes 4 patch antenna elements 121, 122, 123 and 124. One of the patch antenna elements 121, 122, 123 and 124 is configured as a transmission antenna, and the other three of the patch antenna elements 121, 122, 123 and 124 are configured as reception antennas. For example, the patch antenna elements 121, 122 and 123 may be reception antennas. The distance DA between the patch antenna elements 121 and 122 may be substantially equal to 0.5 wavelength ($\lambda/2$) of the aforementioned mmWave operational frequency. The distance DB between the patch antenna elements 121 and 123 may be substantially equal to 0.5 wavelength ($\lambda/2$) of the aforementioned mmWave operational frequency. In addition, the patch antenna element 124 may be a transmission antenna. The distance DC between the patch antenna elements 122 and 124 may be longer than or equal to 0.5 wavelength ($\lambda/2$) of the aforementioned mmWave operational frequency. In alternative embodiments, the antenna layer 120 includes fewer or more antenna elements.

In the embodiment of FIGS. 2A, 2B and 2C, the metamaterial layer 130 includes a carrier substrate 150 and a plurality of conductive structure units 160-1, 160-2, . . . , and 160-N, where "N" is a positive integer greater than or equal to 9. For example, the carrier substrate 150 may be an FR4 (Flame Retardant 4) substrate. The conductive structure units 160-1, 160-2, . . . , and 160-N are periodically and symmetrically arranged on a surface of the carrier substrate 150. The opposite surface of the carrier substrate 150 is adjacent to the patch antenna elements 121, 122, 123 and 124 of the antenna layer 120. In some embodiments, the aforementioned positive integer "N" is symmetrically increased or decreased according to the different sizes of the metamaterial layer 130.

Figure 3A:
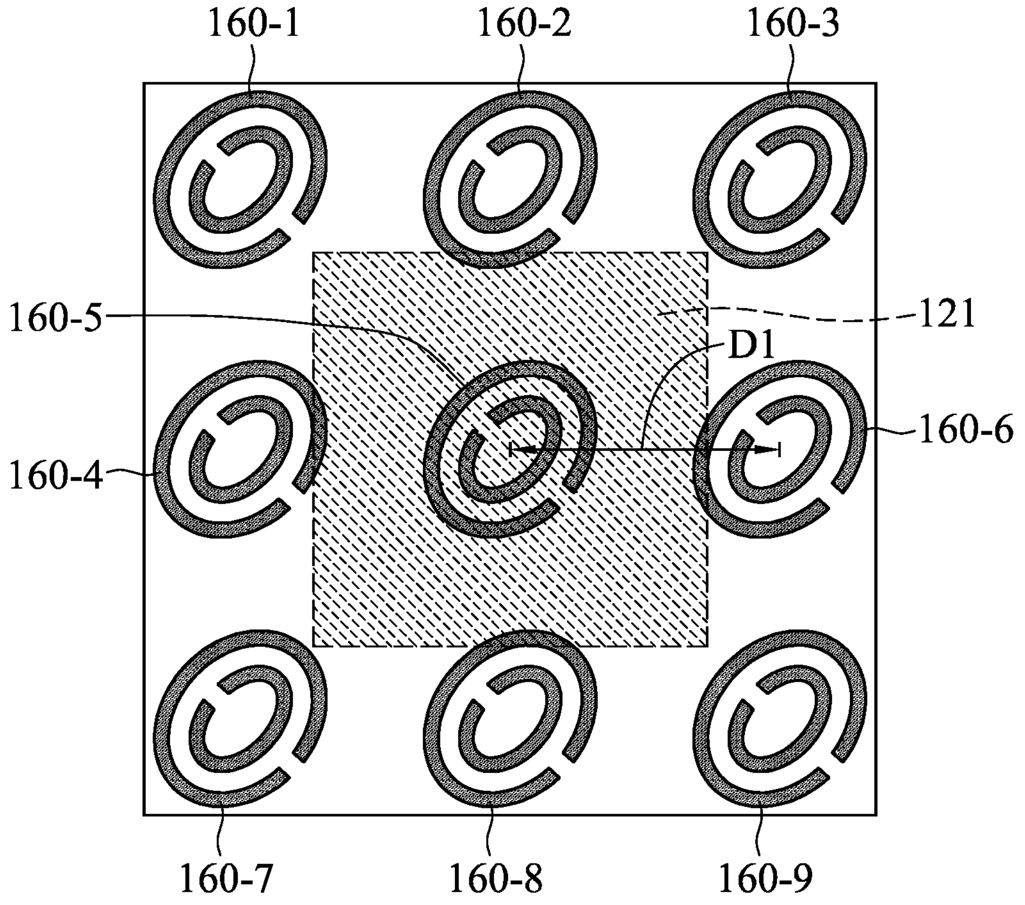
FIG. 3A is a partial top view of an antenna layer and a metamaterial layer according to an embodiment of the invention.
Figure 3B:
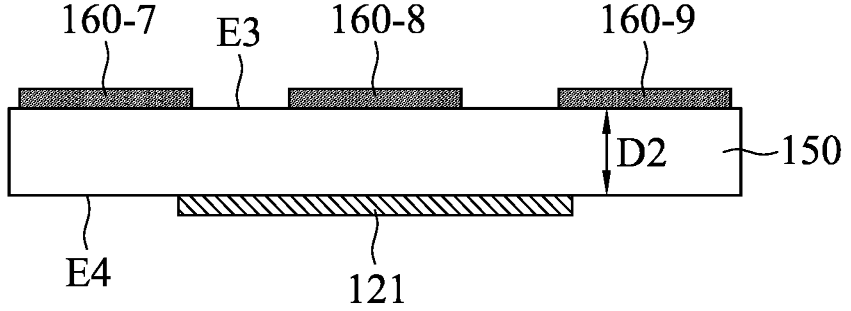
FIG. 3B is a partial side view of an antenna layer and a metamaterial layer according to an embodiment of the invention.

FIG. 3A is a partial top view of the antenna layer 120 and the metamaterial layer 130 according to an embodiment of the invention (the carrier substrate 150 is displayed as a transparent element to simplify the figure). FIG. 3B is a partial side view of the antenna layer 120 and the metamaterial layer 130 according to an embodiment of the invention. Please refer to FIG. 3A and FIG. 3B.

In the embodiment of FIG. 3A and FIG. 3B, the carrier substrate 150 has a third surface E3 and a fourth surface E4 which are opposite to each other. There are 9 conductive structure units 160-1, 160-2, . . . , and 160-9 disposed on the third surface E3 of the carrier substrate 150. The patch antenna element 121 directly touches the fourth surface E4 of the carrier substrate 150. That is, the patch antenna element 121 corresponds to the conductive structure units 160-1, 160-2, . . . , and 160-9. Specifically, at least one of the conductive structure units 160-1, 160-2, . . . , and 160-9 (e.g., the conductive structure unit 160-5) has a vertical projection on the fourth surface E4 of the carrier substrate 150, and such a vertical projection at least partially overlaps the patch antenna element 121. In addition, the others of the conductive structure units 160-1, 160-2, . . . , and 160-9 have vertical projections on the fourth surface E4 of the dielectric substrate 150, and these vertical projections substantially surround the patch antenna element 121.

In alternative embodiments, the other patch antenna elements 122, 123 and 124 are designed in a similar way, and they correspond to the others of the conductive structure units 160-1, 160-2, . . . , and 160-N. It will not be illustrated again herein.

It should be understood that the conductive structure units 160-1, 160-2, . . . , and 160-N of the metamaterial layer 130 are configured to change the equivalent refractive index of the surrounding environment, thereby prevent the environmental factors from negatively affecting the radiation performance of the antenna layer 120.

Figure 4A:
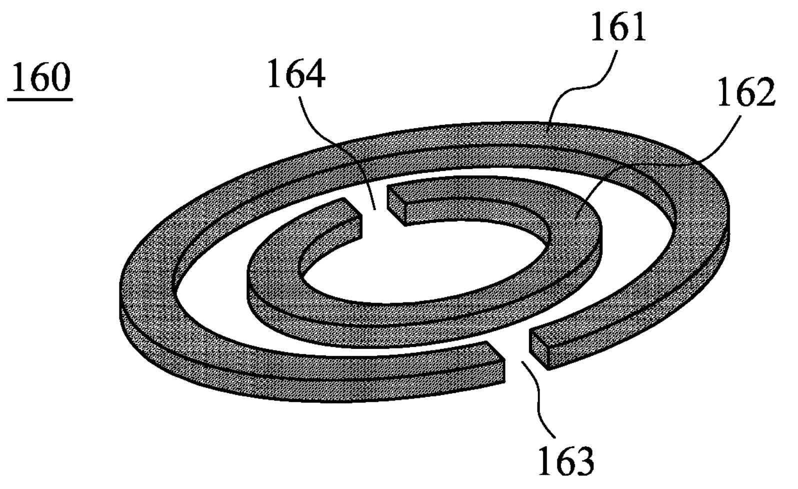
FIG. 4A is a perspective view of a single conductive structure unit according to an embodiment of the invention.

FIG. 4A is a perspective view of a single conductive structure unit 160 according to an embodiment of the invention. In the embodiment of FIG. 4A, each conductive structure unit 160 includes a first C-shaped portion 161 and a second C-shaped portion 162, and the second C-shaped portion 162 is positioned inside the first C-shaped portion 161. Specifically, in the conductive structure unit 160, the first C-shaped portion 161 has a first opening 163, and the second C-shaped portion 162 has a second opening 164. The first opening 163 and the second opening 164 are oriented toward different directions. For example, the first opening 163 and the second opening 164 may be exactly toward opposite directions.

Figure 4B:
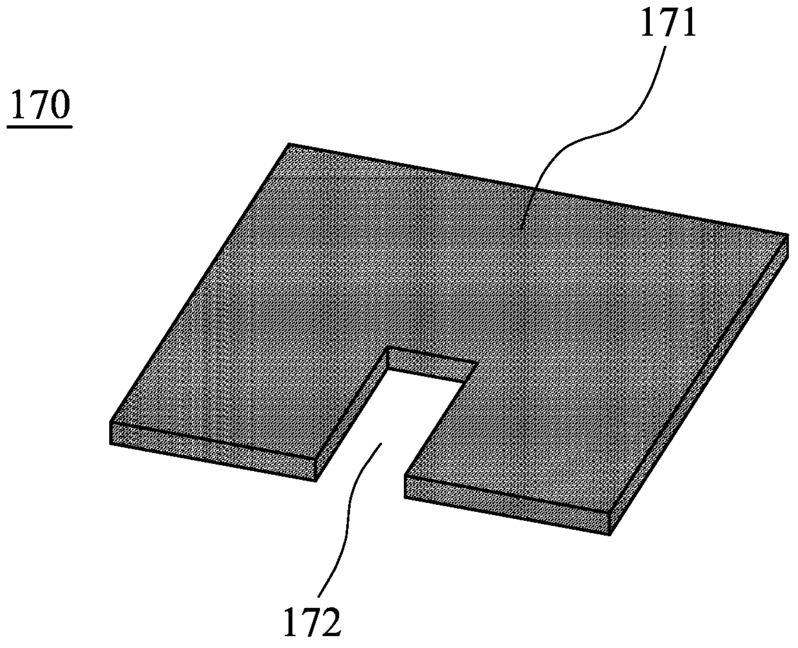
FIG. 4B is a perspective view of a single conductive structure unit according to another embodiment of the invention.
Figure 4C:
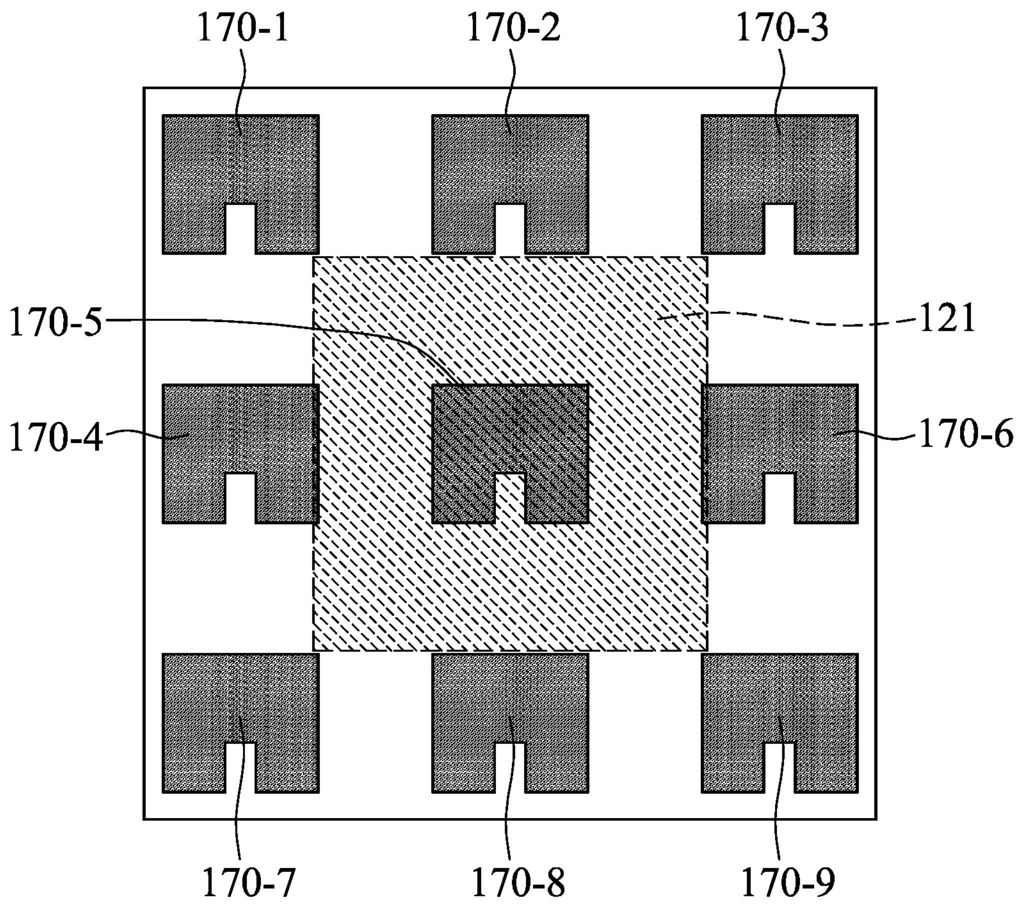
FIG. 4C is a partial top view of an antenna layer and a metamaterial layer according to another embodiment of the invention.

FIG. 4B is a perspective view of a single conductive structure unit 170 according to another embodiment of the invention. In the embodiment of FIG. 4B, each conductive structure unit 170 is a rectangular plate 171 with a central notch 172. For example, a plurality of conductive structure units 170 may be periodically arranged on the third surface E3 of the carrier substrate 150, and they may correspond to the patch antenna element 121. According to practical measurements, the conductive structure units 160 and 170 with different shapes can provide similar operational performance. FIG. 4C is a partial top view of the antenna layer 120 and the metamaterial layer 130 according to another embodiment of the invention (the carrier substrate 150 is displayed as a transparent element to simplify the figure). FIG. 4C is similar to FIG. 3A. In the embodiment of FIG. 4C, there are 9 conductive structure units 170-1, 170-2, . . . , and 170-9 disposed on the carrier substrate 150.

In some embodiments, the element sizes and parameters of the communication device 100 are described as follows. The length of each of the patch antenna elements 121, 122, 123 and 124 may be substantially equal to 0.25 wavelength (λ/4) of the mmWave operational frequency of the communication device 100. The width of each of the patch antenna elements 121, 122, 123 and 124 may be substantially equal to 0.25 wavelength (λ/4) of the mmWave operational frequency of the communication device 100. The thickness H1 of the first absorber element 141, the thickness H2 of the second absorber element 142, and the thickness H3 of the third absorber element 143 may be from 0.5 mm to 2 mm. The center-to-center distance D1 between any two adjacent conductive structure units 160-1, 160-2, . . . , and 160-N may be from 0.4 mm to 0.6 mm. For example, the center-to-center distance D1 between any two adjacent conductive structure units 160-1, 160-2, . . . , and 160-N may be substantially equal to 0.53 mm. The distance D2 between the conductive structure units 160-1, 160-2, . . . , and 160-N and the antenna layer 120 (or the distance D2 between the third surface E3 and the fourth surface E4 of the carrier substrate 150) may be from 0.05 mm to 0.15 mm. For example, the distance D2 between the conductive structure units 160-1, 160-2, . . . , and 160-N and the antenna layer 120 may be substantially equal to 0.102 mm. The above ranges of element sizes and parameters are obtained according to many experiment results, and they help to optimize the whole communication quality of the communication device 100.

Figure 5:
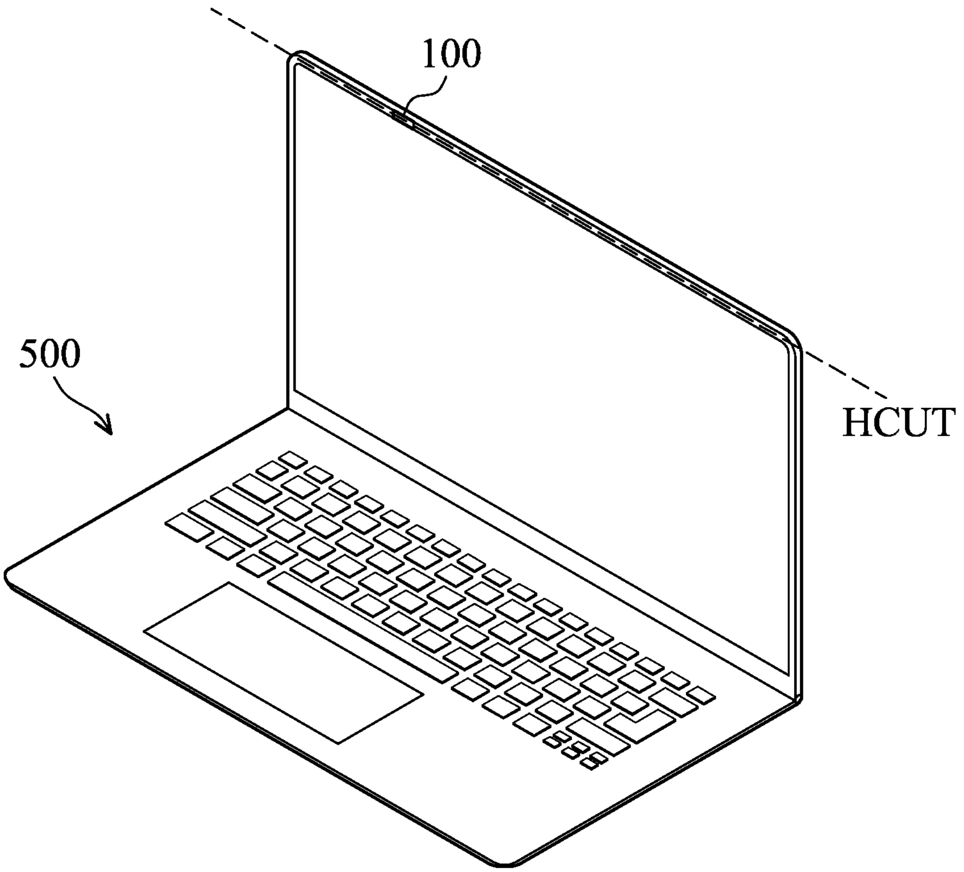
FIG. 5 is a perspective view of a communication device applied to a notebook computer according to an embodiment of the invention.
Figure 6:
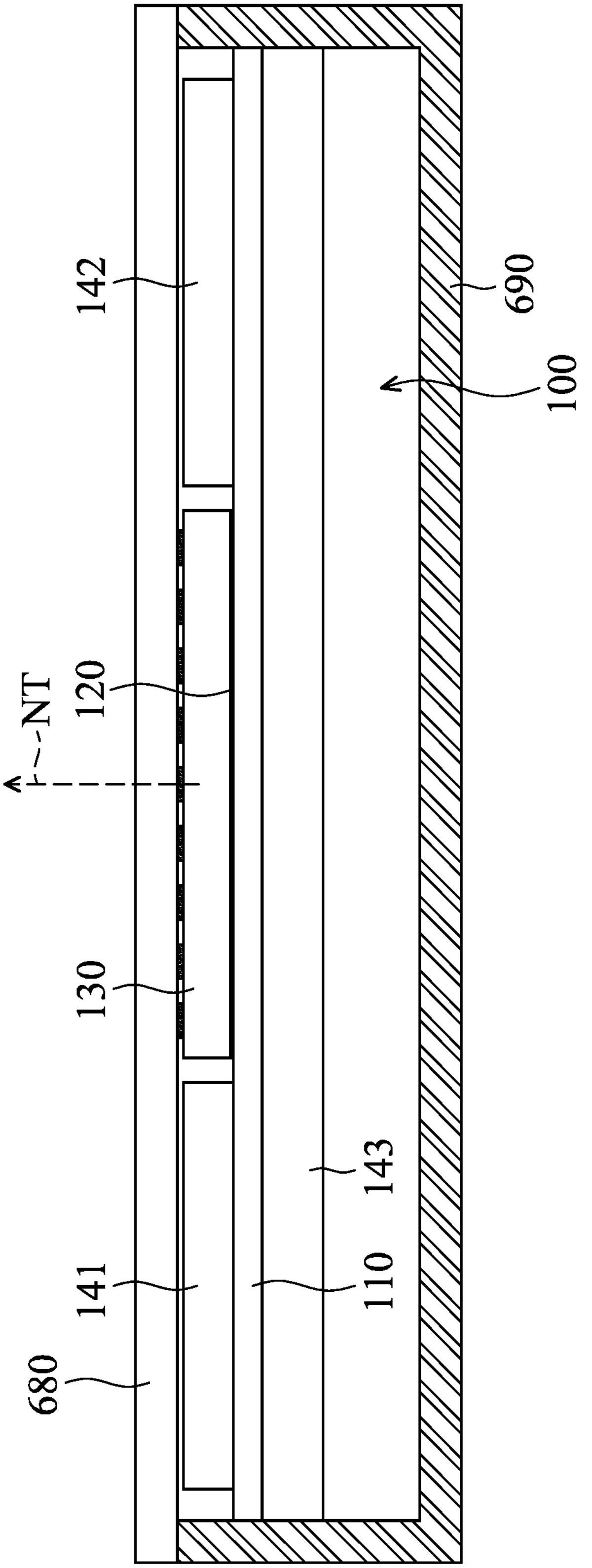
FIG. 6 is a partial sectional view of a communication device and a surrounding environment of a notebook computer according to an embodiment of the invention.

FIG. 5 is a perspective view of a communication device 100 applied to a notebook computer 500 according to an embodiment of the invention. FIG. 6 is a partial sectional view of the communication device 100 and the surrounding environment of the notebook computer 500 according to an embodiment of the invention. In the embodiment of FIG. 5 and FIG. 6, if the communication device 100 is applied to the notebook computer 500, the communication device 100 will be surrounded by a glass plate 680 and a metal sidewall 690 of the notebook computer 500. According to practical measurements, the first absorber element 141, the second absorber element 142, and the third absorber element 143 are configure to eliminate the multipath reflections caused by the metal sidewall 690. On the other hand, the metamaterial layer 130 is configured to eliminate the non-ideal reflections or refractions caused by the glass plate 680, such that the main beam of the antenna layer 120 can substantially extend along the normal direction NT of the glass plate 680.

Figure 7:
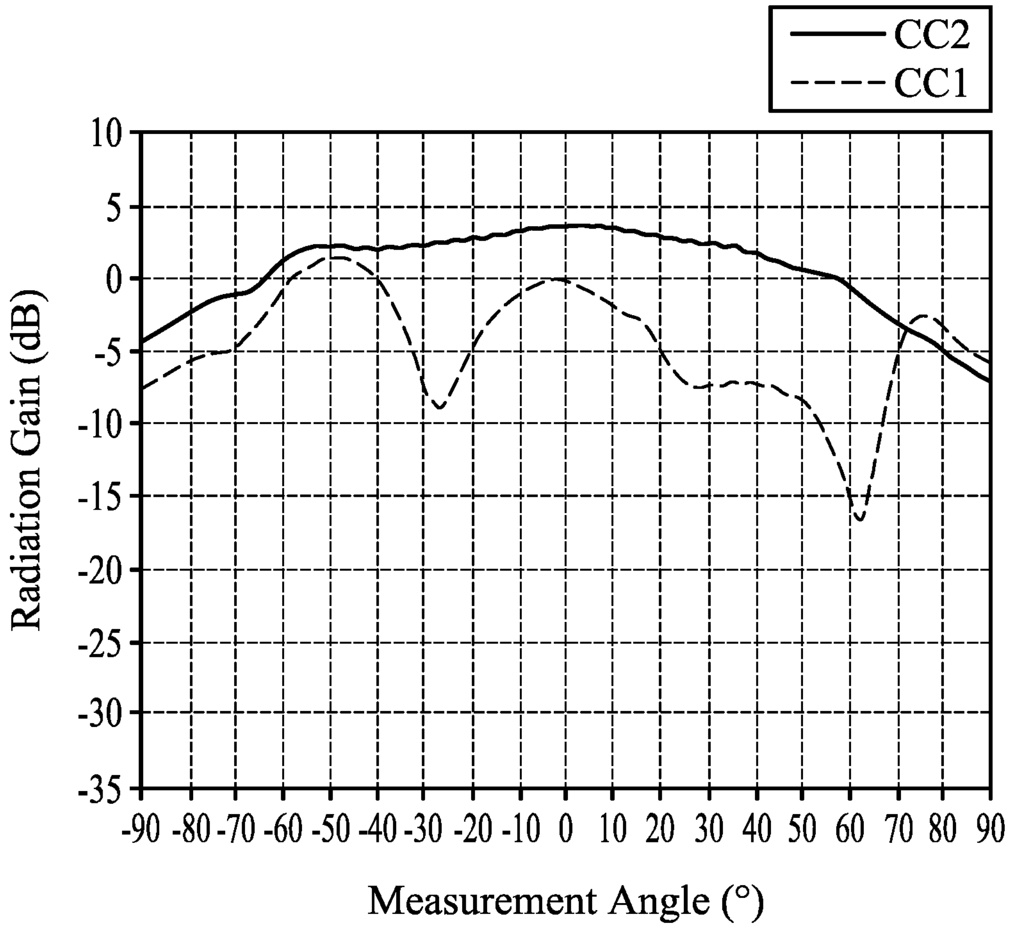
FIG. 7 is a diagram of radiation gain of a communication device applied to a notebook computer according to an embodiment of the invention.

FIG. 7 is a diagram of radiation gain of the communication device 100 applied to the notebook computer 500 according to an embodiment of the invention, and it is measured along a horizontal section HCUT of the notebook computer 500. As shown in FIG. 7, a first curve CC1 represents the radiation gain of the antenna layer 120 when the first absorber element 141, the second absorber element 142, the third absorber element 143, and the metamaterial layer 130 are not in use, and a second curve CC2 represents the radiation gain of the antenna layer 120 when the first absorber element 141, the second absorber element 142, the third absorber element 143, and the metamaterial layer 130 are all in use. According to the measurement of FIG. 7, the design of the invention can help to increase the radiation gain of the communication device 100 by 10 dB or higher, thereby significantly reducing a variety of multipath interferences relative to the communication device 100.

The invention proposes a novel communication device. In comparison to the conventional design, the invention can provide higher communication quality and lower multipath interferences. Therefore, the invention is suitable for application in a variety of mobile devices.

Note that the above element sizes, element shapes, and frequency ranges are not limitations of the invention. An antenna designer can fine-tune these settings or values according to different requirements. It should be understood that the communication device of the invention is not limited to the configurations of FIGS. 1-7. The invention may merely include any one or more features of any one or more embodiments of FIGS. 1-7. In other words, not all of the features displayed in the figures should be implemented in the communication device of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A communication device, comprising:

a dielectric substrate, having a first surface and a second surface opposite to each other;

an antenna layer, disposed on the first surface of the dielectric substrate;

a metamaterial layer, disposed adjacent to the antenna layer;

a first absorber element;

a second absorber element, wherein the antenna layer and the metamaterial layer are positioned between the first absorber element and the second absorber element; and a third absorber element, disposed on the second surface of the dielectric substrate;

wherein an absorption frequency of electromagnetic waves of the first absorber element, the second absorber element, and the third absorber element is from 10 GHz to 100 GHz.

2. The communication device as claimed in claim 1, wherein the antenna layer supports a mmWave (Millimeter Wave) operational frequency at 60 GHz.

3. The communication device as claimed in claim 1, wherein each of the first absorber element and the second absorber element substantially has a rectangular shape, and wherein the third absorber element substantially has another rectangular shape.

4. The communication device as claimed in claim 1, wherein a thickness of each of the first absorber element, the second absorber element, and the third absorber element is from 0.5 mm to 2 mm.

5. The communication device as claimed in claim 1, wherein the antenna layer comprises at least one antenna element.

6. The communication device as claimed in claim 5, wherein the antenna layer comprises 4 patch antenna elements.

7. The communication device as claimed in claim 5, wherein the metamaterial layer comprises:

a carrier substrate, disposed adjacent to the antenna element; and a plurality of conductive structure units, periodically arranged on the carrier substrate.

8. The communication device as claimed in claim 7, wherein the metamaterial layer comprises 9 conductive structure units.

9. The communication device as claimed in claim 7, wherein a vertical projection of at least one of the conductive structure units at least partially overlaps the antenna element.

10. The communication device as claimed in claim 7, wherein each of the conductive structure units comprises a first C-shaped portion and a second C-shaped portion, and the second C-shaped portion is positioned inside the first C-shaped portion.

11. The communication device as claimed in claim 10, wherein the first C-shaped portion has a first opening, the second C-shaped portion has a second opening, and the first opening and the second opening are oriented toward different directions.

12. The communication device as claimed in claim 7, wherein each of the conductive structure units is a rectangular plate with a central notch.

13. The communication device as claimed in claim 7, wherein a center-to-center distance between any two adjacent conductive structure units is from 0.4 mm to 0.6 mm.

14. The communication device as claimed in claim 7, wherein a center-to-center distance between any two adjacent conductive structure units is substantially equal to 0.53 mm.

15. The communication device as claimed in claim 7, wherein a distance between the conductive structure units and the antenna layer is from 0.05 mm to 0.15 mm.

16. The communication device as claimed in claim 7, wherein a distance between the conductive structure units and the antenna layer is substantially equal to 0.102 mm.

* * * * *